United States Patent [19]

Henderson et al.

[11] Patent Number: 4,959,882
[45] Date of Patent: Oct. 2, 1990

[54] WINDSHIELD WIPER WEATHERSHIELD AND SPRAYER

[76] Inventors: Donald L. Henderson, 5553 S. Peoria, Suite 104, Tulsa, Okla. 74105; Elden O. Henderson, Jr., 532 E. Curtis, Midwest City, Okla. 73110

[21] Appl. No.: 274,363

[22] Filed: Nov. 21, 1988

[51] Int. Cl.$^5$ .............................................. B60S 1/46
[52] U.S. Cl. .............................. 15/250.04; 15/250.02; 239/284.1
[58] Field of Search ........... 15/250.01, 250.02, 250.04; 239/284.1

[56] References Cited

U.S. PATENT DOCUMENTS

| | | | |
|---|---|---|---|
| 1,868,783 | 7/1932 | Williams . | |
| 2,354,440 | 7/1944 | Brown | 15/250.4 |
| 2,562,302 | 7/1951 | Downey | 15/250.4 |
| 2,562,819 | 7/1951 | Rappl | 15/250.4 |
| 3,143,753 | 8/1964 | Torelv | 15/250.4 |
| 3,321,792 | 5/1967 | Senkewich | 15/250.4 |
| 3,371,368 | 3/1968 | Walker | 15/250.4 |
| 3,431,577 | 3/1969 | Minsky | 15/250.4 |
| 3,574,881 | 4/1971 | Temple | 15/250.4 |
| 3,793,670 | 2/1974 | Riester et al. | 15/250.04 |
| 3,913,167 | 10/1975 | Frigon | 239/284.1 X |
| 3,939,524 | 2/1976 | Knights | 15/250.04 |
| 3,969,783 | 7/1976 | Shipman | 15/250.4 |
| 4,060,872 | 12/1977 | Bucklitzsch | 15/250.04 |
| 4,192,038 | 3/1980 | Klein | 15/250.4 |
| 4,339,839 | 7/1982 | Knights | 15/250.4 |
| 4,754,517 | 7/1988 | Aldous | 15/250.4 |
| 4,766,636 | 8/1980 | Shinpo | 15/250.2 X |

FOREIGN PATENT DOCUMENTS

| | | | |
|---|---|---|---|
| 2041600 | 2/1972 | Fed. Rep. of Germany | 15/250.04 |
| 1217562 | 12/1959 | France | 15/250.04 |

*Primary Examiner*—Frankie L. Stinson
*Attorney, Agent, or Firm*—Head & Johnson

[57] ABSTRACT

A weather shield housing is mounted on a conventional windshield wiper for automobiles. The housing is an elongated rectangular box with the bottom side completely open. A centrally located nozzle in the top of the housing directs water or fluid in both directions along the length of the housing above the wiper blade. The centrally located nozzle is connected by hose to the windshield washer pump terminal between the hood of a car. The housing fits over a regular wiper blade holder and wiper blade and is held in position by the same connecting pin which connects the windshield wiper arm to the wiper blade holder. However, the housing may be manufactured with a conventional wiper blade holder permanently affixed within it so that the housing can be connected to the windshield wiper arm either at the top of or at the side of the housing using suitable connectors.

11 Claims, 3 Drawing Sheets

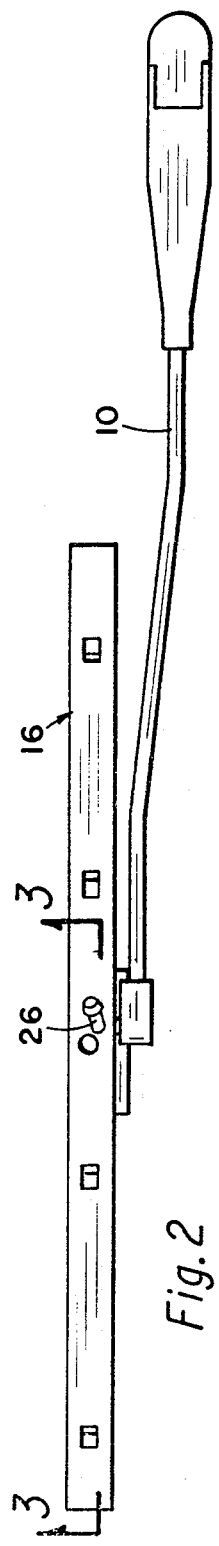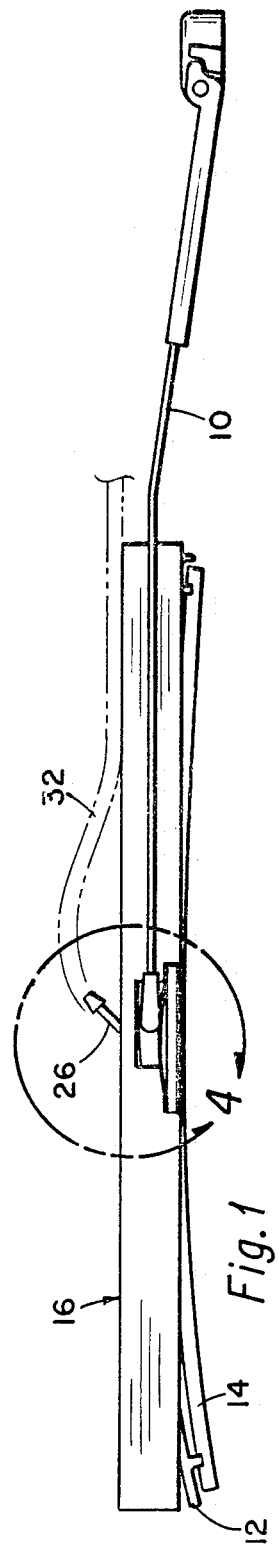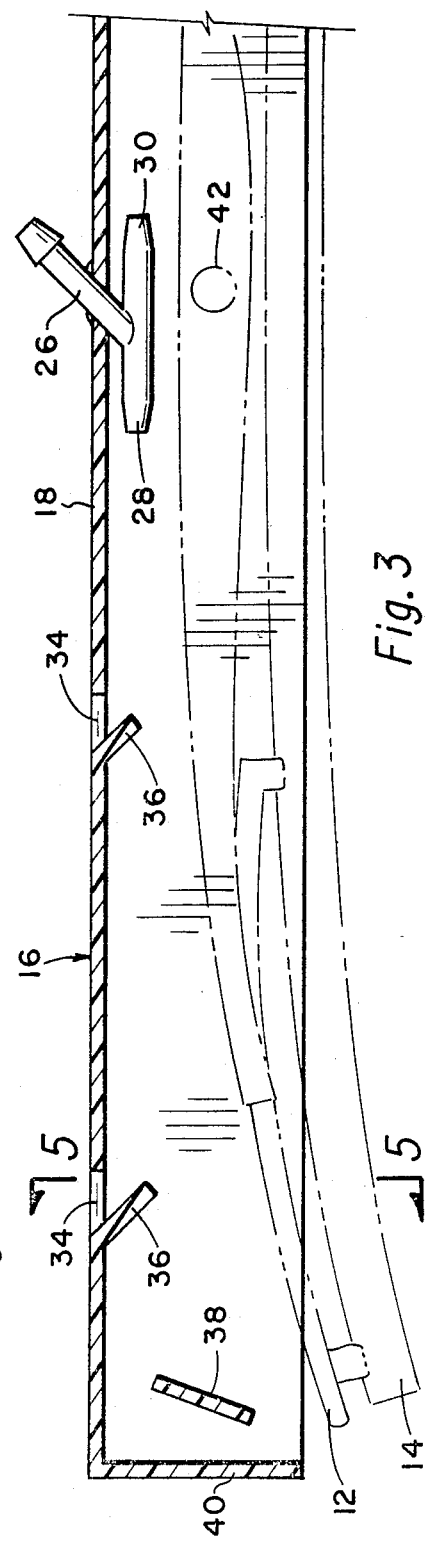

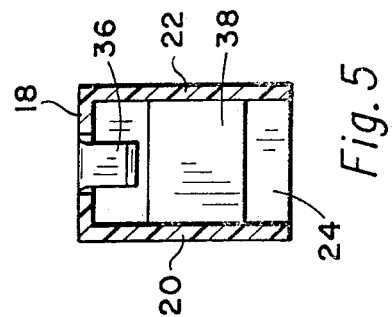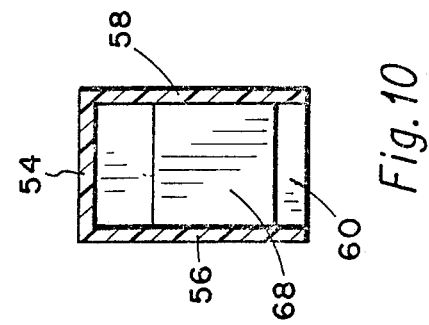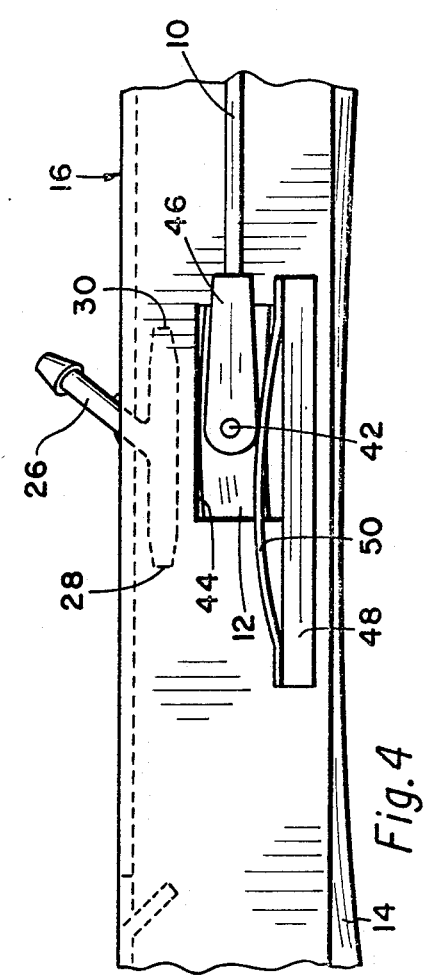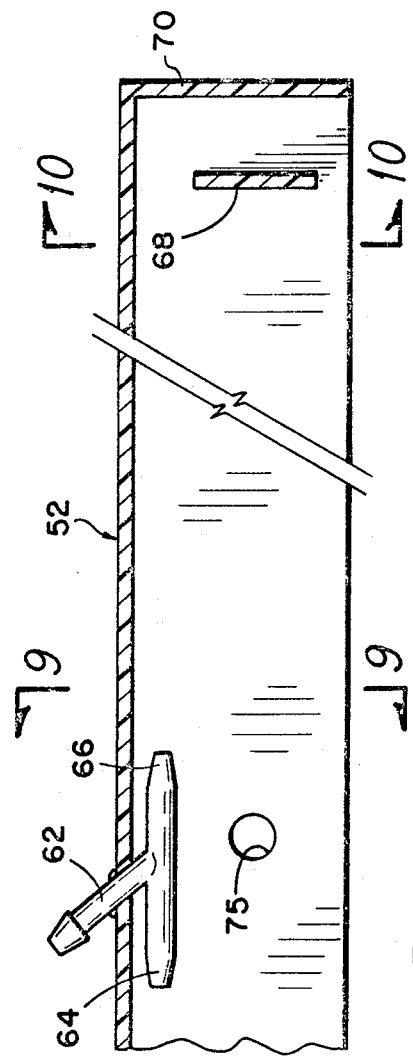

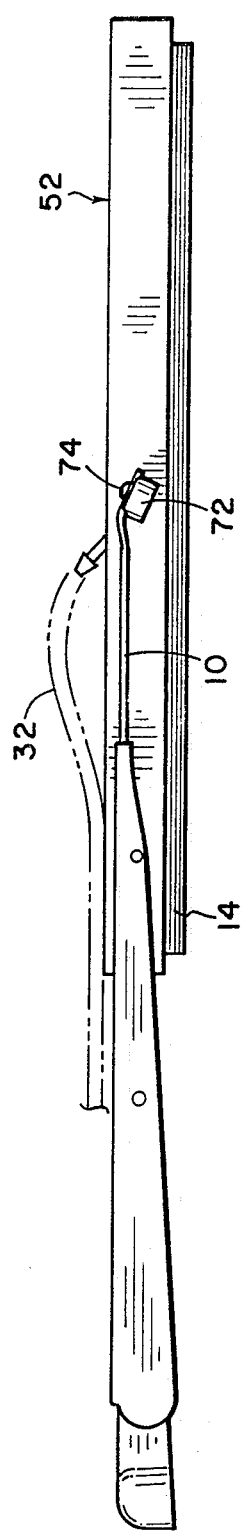
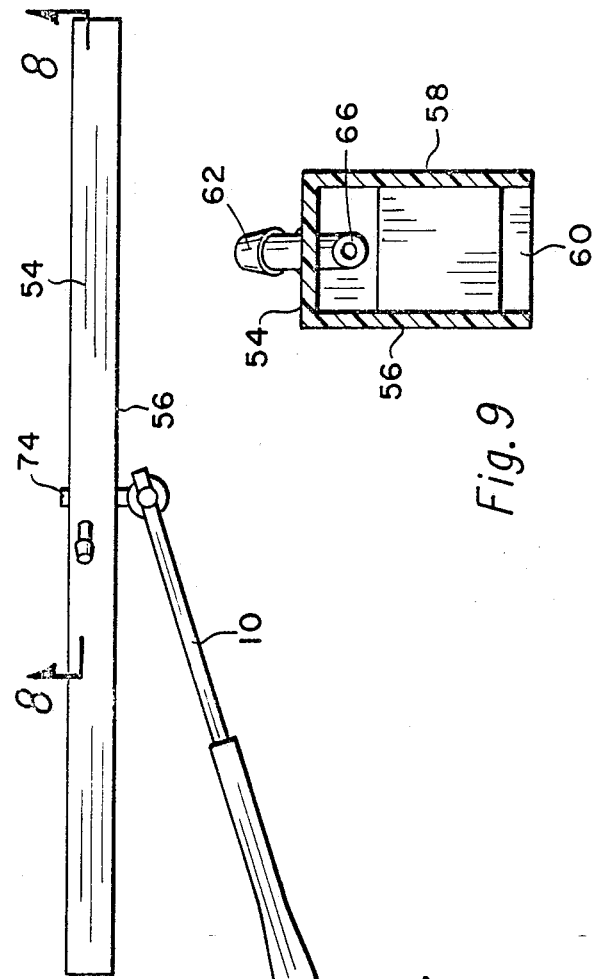
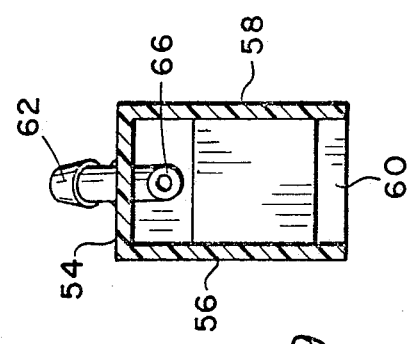

WINDSHIELD WIPER WEATHERSHIELD AND SPRAYER

BACKGROUND OF THE INVENTION

Field of the Invention

This invention relates to windshield wipers and especially to a system for proper placement of the windshield solvent with respect to the windshield wiper blade.

The conventional present manner of washing windshields of automobiles is to provide a reservoir which has a cleaning fluid, usually alcohol-water combination, a pump, rubber tube connectors connecting the pump to a centrally located spray nozzle at a fixed position which when activated squirts the solution onto the entire windshield between swipes of the wiper blade. The problem with the present conventional system sold on most cars is that about forty percent of the solution is sprayed outside the wiper blade contact area and is wasted. If the spray nozzle is not properly set, or if the vehicle is moving, a large portion of the solution goes over the top of the car and is wasted. Even if the nozzle is correctly set, the spray is thin and not concentrated and is gone by the first wipe of the wiper blade. In the winter time upon the falling of freezing rain, snow and sleet, the movable working parts of the wiper blade holder can become stuck together by freezing so that the flexible action and spring tension is lost and therefore proper contact with the windshield is lost. The spray nozzle is most often covered over and does not function. Even if the nozzle does spray, the solution is so diversified and thin that it is essentially useless as a deicer.

Various means have been devised to attempt to overcome these deficiencies of a wiper and washer system used on essentially all automobiles today. Some of those are disclosed in the patents listed in the Disclosure Statement. Although most of these patents have been issued for some time, none of the system described therein to applicant's knowledge is available commercially.

OBJECTS

It is therefore an object of this invention to provide a novel windshield wiper blade assembly having a concentrated application of windshield washing fluid that is easily installed on existing windshield wipers presently used on automobiles.

SUMMARY OF THE INVENTION

A special weather shield housing and washer fluid director is provided to be mounted over a conventional wiper blade holder and wiper blade of the standard windshield wiper systems of automobiles. The housing is essentially the length of the wiper blade holder and blade to which it is to be attached and has two sides, a top and two ends, but the bottom part of the rectangular housing is completely open. A hole is provided through the two sides of the housing for insertion of the pin which attaches the wiper arm to the wiper blade holder. The housing is of a size such that essentially only the wiper blade extends below the housing for contact with the windshield. The housing protects the wiper blade from most of the damaging effects of the elements and especially of the sun rays.

A centrally located nozzle assembly is provided in the housing. It includes a nozzle conduit which extends through the housing top. One end of the conduit is connected to both a first nozzle and a second nozzle which directs fluid in opposite directions throughout the housing along the wiper blade. The end of the nozzle conduit exterior of the housing is connected by a washer fluid hose to the windshield washer pump terminal beneath the hood of the car.

In operation, when it is desired to use the windshield wipers the windshield washer pump is actuated together with the motor driving the wiper blade to and fro across the windshield. The fluid is directed longitudinally along the inside of the housing where it falls about the wiper blade. The windshield cleaning fluid then is directed immediately to the area of the windshield where the wiper blade is in contact therewith so that the fluid is positioned adjacent the blade where it does the most good and is therefore not wasted. The housing acts as a shield and prevents ice, snow and sleet and freezing rain from covering over the working parts of the wiper blade holder so that it keeps spring tensions and flexibility. It also prevent the elements from freezing or covering the spray nozzles which would make them inoperable. The fluid concentrator of the wash (or de-icer) solution has a centally located nozzle in the inside center of the shield that works in conjunction with the conventional pump on any vehicle and sprays solution in both directions inside the shield. Thus, all of the solution is directed and confined to the immediate wiping area of the traveling blade making for a more concentrated cleaning and deicing and more washing type action around the blade.

BRIEF DESCRIPTION OF THE DRAWINGS

FIG. 1 is a side view showing one embodiment of our weather shield housing mounted on a conventional wiper blade holder of an automobile.

FIG. 2 is a top view of the embodiment of FIG. 1.

FIG. 3 is a view taken along the line 3—3 of FIG. 2.

FIG. 4 is an enlarged view of that part indicated by circle 4 of FIG. 1.

FIG. 5 is a view taken along the line 5—5 of FIG. 3.

FIG. 6 is a side view of another embodiment of the invention.

FIG. 7 is a top view of the embodiment of FIG. 6.

FIG. 8 is a view taken along the line 8—8 of FIG. 7.

FIG. 9 is a view taken along the line 9—9 of FIG. 8.

FIG. 10 is a view taken along the line 10—10 of FIG. 8.

DETAILED DESCRIPTION OF THE INVENTION

Attention is first directed to FIGS. 1 and 2 in which FIG. 2 is a top view of the windshield wiper assembly of FIG. 1. Shown thereon is a windshield wiper arm 10 which is connected in the usual manner to windshield wiper blade holder 12 which supports wiper blade 14. A weather shield housing 16 is mounted over the wiper blade holder 12. As shown in FIG. 5 weather shield housing 16 has a top 18, a first side 20, a second side 22, and an open bottom 24. A centrally located nozzle conduit 26 extends upwardly through the top 18 of the weather shield housing 16. Nozzle conduit 26 is connected to dual nozzles 28 and 30. Nozzle 28 directs fluid toward one end of the housing and nozzle 30 directs the fluid to the other end. The end of nozzle conduit 26 exterior of the housing is connected by washer fluid hose 32 to a windshield washer pump terminal beneath the hood of a car. The top of weather shield housing 16 is provided with a plurality of ports 34 with downwardly extending deflectors 36 which extend downwardly to within the interior of housing 18. Stop means 38 are provided at each end 40 of the housing and is slightly askew with respect to the ends 40. Stop means 38 comes in contact with the wiper blade holder and prevents the housing from coming into contact with the windshield. Thus, fluid from nozzle 28 is directed into the hollow interior of the housing 16 and is mostly diverted downwardly around the wiper blade holder 12 and wiper blade 14 to where the fluid contacts the windshield just as the wiper blade 14 is passing across that part of the windshield. A part of the fluid from nozzle 28 will hit deflectors 36 and be directed upwardly through port 34 and be along the exterior of the top 18 of the housing 16. If the fluid is a deicer it will tend to prevent accumulation of ice on top 18 of the housing 16.

Attention is next directed to FIGS. 4 and 5 which illustrates one manner of securing the housing 16 to the conventional windshield wiper unit. Shown thereon is a rectangular opening 44. Wiper arm 10 has a connecting head 46 with pin 42 which connects to wiper blade holder 12. The connecting head 46 and pin 42 can be removed from the wiper blade holder 12. The housing 16 is then mounted over the wiper blade holder in a snug fit. Then the pin 42 is reattached to the wiper blade holder 12 in the normal manner. Holes are provided in housing 16 to accommodate the pin conecting the wiper arm to the particular wiper blade holder which is on the vehicle to which our invention is applied. A spring support bar 48 may be provided and is rigidly attached to or made an integral part of side 20 of the housing 16. A spring 50 is supported by support bar 48 and has a biasing force against wiper arm connecting head 46. The sizing of the housing 16 and the mounting mechanism is designed such that wiper blade 14 extends out the bottom side of the housing. This is clearly shown in FIG. 4.

Attention is next directed to FIGS. 6, 7, 8, 9 and 10 which show another embodiment of the invention. Shown in FIGS. 6 and 7 are the conventional wiper arm 10 and wiper blade 14. However, the housing 52 is different from housing 16 and is attached to the wiper arm 10 in a slightly different manner. Housing 52 is different from housing 16 in that it has no ports in the top side 54 and no large rectangular hole such as hole 44 of FIG. 4. As shown in FIG. 9 it has sides 56 and 58 and an opened bottom 60. A central nozzle assembly 62 is provided with a first nozzle 64 and a second nozzle 66 which are directed in 180° different directions along the interior of the housing 52. There is a stop means 68 near one end 70 of housing 52 which by coming in contact with the wiper arm, prevents the housing from contacting the windshield.

As shown in FIGS. 6 and 7 windshield wiper arm 10 has a head 72 with a connecting pin 74 which are conventional. This pin 74 extends through side 56 of housing 52, through the wiper blade holder 12 and through the other side 58 of housing 52. The housing shield fits snugly over the wiper holder in the vicinity where the holder is secured to the connecting pin 74 of the wiper arm. Connecting pin 74 is normally removably held to the wiper blade holder by spring loaded detents or other well known means. By mounting the housing over the wiper blade holder as shown in FIGS. 6 and 7 before the pin 74 is extended through the normal hole with fastening means of the blade holder 12 the housing 52 is held in position.

The operation of the embodiment of FIGS. 6 and 7 is essentially the same as that described above in regard to that of FIGS. 1, 2 and 3. However, there are no ports in the upper side or top 54 of the housing 52 so all of the windshield washer cleaning fluid is directed inside the housing and falls down around the wiper blade 14. The windshield cleaning fluid is directed then right adjacent the wiper blade 14 which is exactly where we want it. This makes a most efficient use of the windshield cleaning fluid.

It is thus seen that we have a windshield wiper and spray nozzle weather shield and concentrator for washing fluids or de-icing solution as may be used. As a housing shield it prevents ice, snow, sleet and freezing rain from covering over the working parts of the wiper blade holder so that it keeps its spring tension and flexibility. The housing shield also prevents the elements from covering or clogging up the spray nozzle which frequently happens on most cars which makes the spray nozzle inoperable. This is also a concentrator of the washing or deicing solution in that it has a centrally located nozzle on the inside center of the housing shield that is connected to a conventional pump on any vehicle and spray solution in both directions inside the shield so that the fluid is placed along the wiper blade itself where it is most needed. It is thus seen by the use of our invention that there is a most efficient operation or use of the washer or deicing solution. It does not cover areas of the windshield that the wiper will not contact and inasmuch as the washing fluid is mostly confined inside the housing, wind will not blow it up over the top of the car when the car is driven down the highway. Thus, essentially all of the solution is directed and confined to the immediate wiping area of the traveling wiper blade making for more concentrated cleaning and de-icing and a more flushing type action around the blade. It is also to be noted that no modification has to be made to the wiper arm, the wiper blade holder or the wiper blade. The washing shield housing of our invention is placed over the wiper blade holder and wiper blade. A hose is connected between the nozzle of our housing and the outlet of the pump of the car. It is most simple to install, yet it still has the advantages listed above.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What we claim:

1. In an existing windshield cleaning assembly of a wiper arm,
   a wiper blade holder supported by said wiper arm,
   a wiper blade supported by said wiper blade holder and a fluid pump, the improvement comprising:
   a housing having a top, two sides and two ends with an open bottom;
   a two-way nozzle centrally located within said housing, one nozzle directed toward one end of said housing and the other toward the other end of said housing;

hose means connecting said two way nozzle to said pump; and means to secure said housing to said wiper blade holder.

2. A device as defined in claim 1 in which said means to secure includes a pin on said wiper arm which extends at least through one side of said housing.

3. A combination as defined in claim 1 in which said means to secure includes a hole on each side of said housing about centrally located and a pin of said wiper arm which extends through one of said holes, said wiper blade holder and the said hole in the housing.

4. A combination as defined in claim 1 including stop means in said housing near each end thereof and spaced from said wiper blade to prevent said housing from contacting said windshield.

5. A combination of a windshield cleaning device with a fluid pump which comprises:
   a wiper arm;
   a wiper blade holder supported by said wiper arm;
   a wiper blade supported by said wiper blade holder;
   a housing having a top, two sides and two ends with an open bottom said top of said housing is provided with a plurality of ports and a downwardly sloping baffle with each said port;
   a two-way nozzle centrally located within said housing, one nozzle directed toward one end of said housing and the other toward the other end of said housing;
   hose means connecting said two way nozzle to said pump; and
   means to secure said housing to said wiper blade holder.

6. A device as defined in claim 5 in which said means to secure includes a pin on said wiper arm which extends at least through one side of said housing.

7. A combination as defined in claim 5 in which said means to secure includes a hole on each side of said housing about centrally located and a pin of said wiper arm which extends through one of said holes, said wiper blade holder and the said hole in the housing.

8. A combination as defined in claim 5 including stop means in said housing near each end thereof to prevent said housing from contacting said windshield.

9. A device for use with a windshield wiper which includes a wiper arm, a wiper blade holder, and a wiper blade which comprises:
   a rectangular shaped housing having a top, a first side and a second side, a first end and a second end with the bottom opened said top is provided with a plurality of ports, each port having a downwardly extending deflector;
   a first nozzle and a second nozzle supported inside said housing and centrally located, said first nozzle pointing toward said first end and said second nozzle pointing toward said second end; and
   a nozzle conduit connected to each said nozzle and extending out said top.

10. A device as defined in claim 9 in which each said side has a hole therethrough at about the midpoint for receiving a connecting pin from said washer arm.

11. A device as defined in claim 9 including a stop means in each end of said housing on the interior thereof.

* * * * *